S. BLIM.
Machines for Cutting Meat and Vegetables.
No. 134,458.          Patented Dec. 31, 1872.
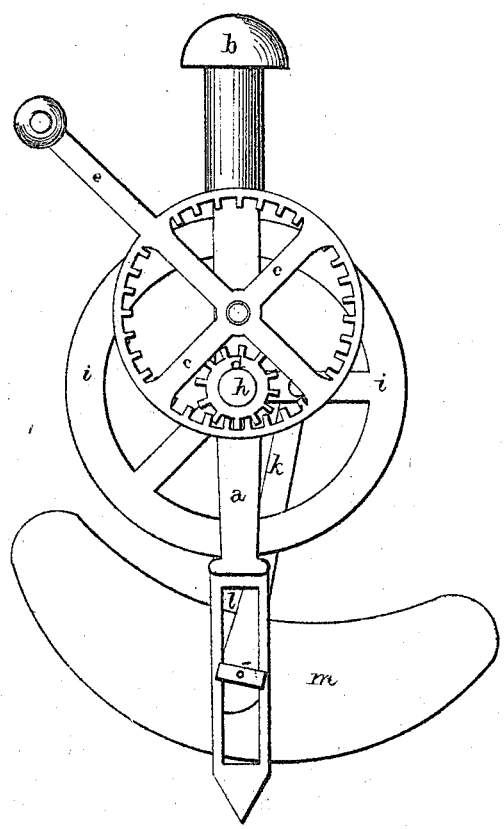
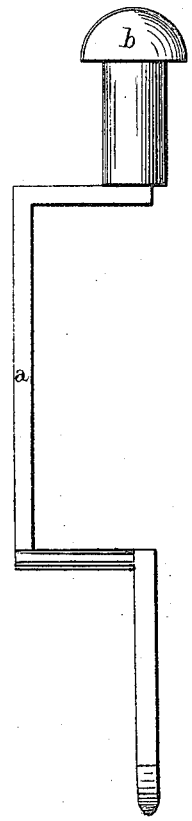

UNITED STATES PATENT OFFICE.

SOLOMON BLIM, OF SALEM, OHIO, ASSIGNOR OF ONE-HALF HIS RIGHT TO NEWBERRY A. MORLAN, OF SAME PLACE.

IMPROVEMENT IN MACHINES FOR CUTTING MEATS AND VEGETABLES.

Specification forming part of Letters Patent No. 134,458, dated December 31, 1872.

*To all whom it may concern:*

Be it known that I, SOLOMON BLIM, of Salem, county of Columbiana and State of Ohio, have invented certain new and usful Improvements in Machine for Cutting Meat, Hash, and Vegetables, of which the following is a specification:

The nature of my invention relates to that class of machines used for cutting meat, hash, and vegetables; and consists in providing them with a recessed and slotted standard having a point and knob or handle, so that they can be readily carried about and used in any pan or pail instead of being secured to a table or stand. It also consists in securing the cutting-blade to the pitman so as to obtain a rolling or gradual cut, as will hereafter be more fully set forth.

Figure 1 is a side elevation of my machine. Fig. 2 is a detailed view of the same.

*a* represents the standard, recessed and slotted to receive the operating mechanism, and having its lower bearing end sharpened to a point, and the handle *b* secured to its top so as to enable the operator not only to hold it in any desired position, but to carry it readily around so as to be used in any pail or pan without having to carry the article to be chopped to the machine, as is usually the case. Pivoted to this standard is the driving-wheel *c*, having its internal face provided with cogs so as to gear with the pinion *d*, and to which is secured the handle *e*. The pinion *d* is secured to a short shaft, *h*, which is just long enough to pass through the standard *a* and have the large fly-wheel *i* secured to its other end. To this wheel is pivoted the pitman *k*, which has its lower end secured in the slot *l* so as to guide its movements, and to which is fastened the rounded cutter-blade *m*. This cutter is held at two points, as shown in Fig. 2, and has a slot, *n*, cut in it, so that it can be adjusted to cut deeper or lighter, as may be required.

As motion is communicated to the wheel *i* through the handle *e* and the intermediate gear, a rolling motion from side to side is imparted to the pitman, which causes the cutter to make a similar rolling cut so as to enter the meat obliquely, and thus to require less force to operate it.

By means of the handle *b* the machine can be turned at any angle and moved freely about to any or all parts of the pan, as may be desired.

Having thus described my invention, what I claim as new, and desire to secure by Letters Patent of the United States Government, is—

1. The recessed and pointed standard *a*, provided with the handle *b* and slot *l*, substantially in the manner and for the purpose set forth.

2. The combination of the wheel *i*, pitman *k*, and cutter *m*, when arranged so as to give a rolling cut, substantially as specified.

3. The combination of the standard *a*, handles *b e*, wheels *c d i*, pitman *k*, and cutter *m*, when all are arranged to operate as set forth.

In testimony that I claim the foregoing as my invention I hereunto affix my signature this 4th day of November, 1872.

SOLOMON BLIM.

Witnesses:
 A. E. BONSALL,
 STEPHEN A. BAKER.